Feb. 3, 1959

W. R. GOEHNER 2,872,195

SOUND TRACK POSITION COMPENSATION MEANS FOR RECORD DRUM-LEAD SCREW TYPE TRANSLATING DEVICE

Filed Oct. 4, 1957

INVENTOR
W. R. GOEHNER
BY V. P. Priolo
ATTORNEY

United States Patent Office
2,872,195
Patented Feb. 3, 1959

2,872,195

SOUND TRACK POSITION COMPENSATION MEANS FOR RECORD DRUM-LEAD SCREW TYPE TRANSLATING DEVICE

William R. Goehner, Harding Township, Morris County, N. J., assignor to Bell Telephone Laboratories, Incorporated, New York, N. Y., a corporation of New York Application October 4, 1957, Serial No. 688,366

5 Claims. (Cl. 274—20)

This invention relates to signal recording and reproducing apparatus of the record drum-lead screw type wherein the transducer and record member are actuated by a common means, and more particularly to means for automatically moving the lead screw laterally with respect to record drum to compensate for variations in the record drum position and thereby eliminate amplitude variations in reproduction caused by tracking errors.

In automatic telephone answering and recording devices and in devices used for other special telephone announcing services, there is a need for increased message time without increasing the size of the device. The message time for existing magnetic recording-reproducing devices can be increased by the use of narrower magnetic sound tracks. For example, it would be desirable to use magnetic heads having a pole face width of 0.014 inch or less. However, the present variability in the lateral position of the magnetic head in the reproduce condition as compared with its position during recording has limited the application of narrower sound tracks. This variation is caused by a variation in the record drum position which is, in turn, caused by wear of the drum bearings or end play in the lead screw.

Tracking errors may, of course, be greatly reduced by decreasing the tolerances of the manufactured parts or by the use of selective fits for the drum-lead screw assembly. The increased costs entailed by such an approach to the problem would, however, cancel any economic advantage gained by the achievement of increased message time.

It is an object of this invention to provide means for assuring an accurate retrace of a recorded sound track during the reproducing cycle in a record drum-lead screw type of recording-reproducing apparatus.

In accordance with this invention this objective is achieved by means of a mechanical follower or sensing device which is attached to the lead screw and held by spring means in continuous tangential contact with the lateral face of the record drum. The recording-reproducing head driven by the lead screw is thereby held to the same helical sound track during the recording and reproducing cycles.

Figure 1:
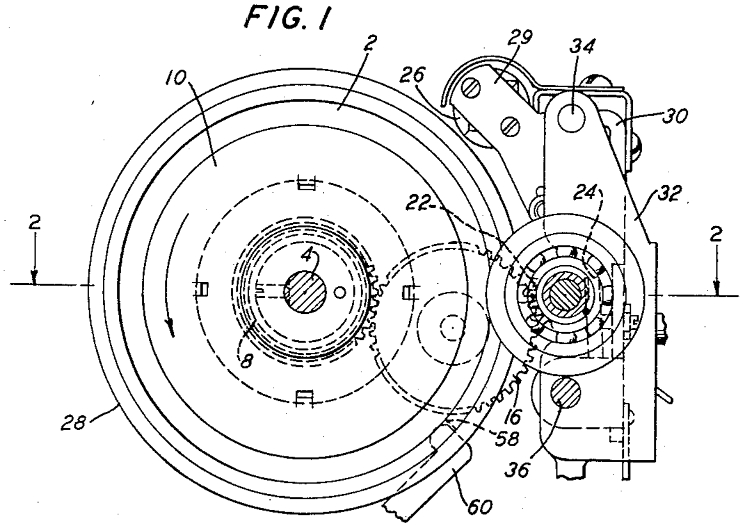
Figure 2:
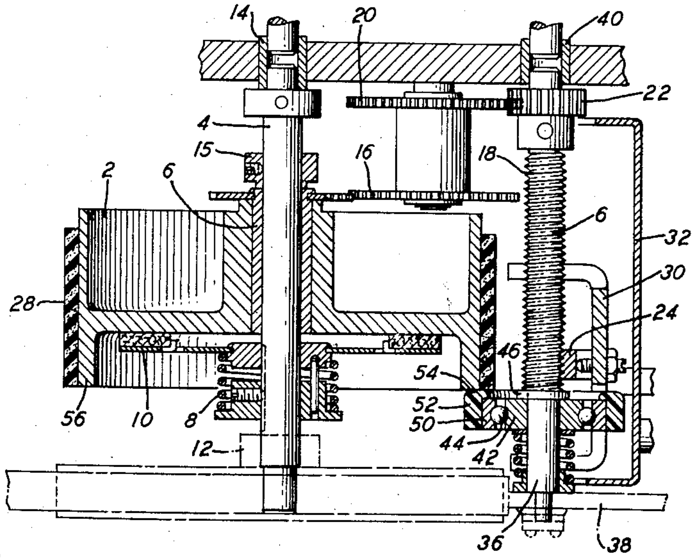

The nature of the invention and its distinguishing features and advantages will be more clearly understood from the following detailed description and the accompanying drawings in which:

Fig. 1 is a view in side elevation, partly in section and with the driving elements removed, of a telephone answering device of the type disclosed in United States Patent 2,761,899, modified to include an embodiment of the present invention; and Fig. 2 is a sectional view taken on the line 2—2 of Fig. 1.

Referring now to the drawings wherein the present invention is shown incorporated in a telephone answering device of the type disclosed in United States Patent 2,761,899, recording-reproducing drum 2 is supported by shaft 4 through bearing 6 contained in the drum, and motion is imparted to the drum by the shaft through constant torque clutch 8. Compliant member 10 of clutch 8 is in constant frictional engagement with the drum. Support for shaft 4 is provided by bearing members 12 and 14. Lateral motion of the drum along the shaft is prevented by thrust collar 15.

Drum 2, on rotating, drives gear 16 which in turn drives lead screw 18 through gears 20 and 22. With lead screw 18 rotating and engaging half-nut 24, transducer 26 is moved across the width of the magnetizable record band 28.

Transducer 26 is mounted on arm 29 of carriage 30 which is pivotally connected to bail 32. Transducer carriage 30 is supported by and slides along bars 34 and 36 which are mounted within bail 32. Half-nut 24 is a component of the transducer carriage. As transducer carriage 30 moves from its zero position it winds up a spiral spring (as described in United States Patent 2,761,899). When half-nut 24 is disengaged from the lead screw this spiral spring pulls carriage 30 back to its zero position. Support for lead screw 18 is provided by bearing members 38 and 40 which, like bearing members 12 and 14 of shaft 4, are disposed in the frame (now shown) of the recording-reproducing device.

Attached to lead screw 18 is the inner race 42 of bearing 44. Bearing race 42 is disposed between collar 46 of lead screw 18 and spring member 48 and may be affixed to the lead screw by a key or other means. Spring member 48 is disposed between bearing member 38 and bearing race 42. The outer race 50 of bearing 44 comprises a ring member 52 which may be made of a material such as nylon. Arcuate portion 54 of member 52 extends beyond the lateral face of bearing 44 to make continuous tangential contact with lateral face 56 of drum 2. Ring member 52 is forced against face 56 of drum 2 by spring member 48.

It will be understood that bearing 44, nylon ring member 52 and spring member 48 cooperate to provide a sensing means or mechanical follower which automatically moves the lead screw laterally with respect to the drum to compensate for any change in the position of the drum caused by wear of the drum bearing.

As described in United States Patent 2,761,899, drum 2 is indexed with respect to lead screw 18 by means of detent 58 on the drum and pawl 60. The indexing means and the sensing means described above assure an accurate retrace, during the reproduction cycle, of the sound track recorded by transducer 26.

Although the invention has been described as it might be applied to the telephone answering and recording device disclosed in United States Patent 2,761,899, it is generally applicable to recording-reproducing devices of the record drum-lead screw type.

It is to be understood that the above-described arrangements are illustrative of the application of the principles of the invention. Other arrangements may be devised by those skilled in the art without departing from the spirit and scope of the invention.

What is claimed is:

1. In a recording-reproducing device comprising a record drum and a lead screw actuated by a common means, sensing means for moving said lead screw laterally with respect to said drum to compensate for variations in the position of said drum, said means including a bearing follower comprising inner and outer races and rotatable members therebetween, said inner race being concentric with and affixed to said lead screw, said outer race comprising a lateral face disposed in contact with a lateral face of said drum, and spring means disposed in such manner as to exert pressure against said inner race and thereby force said outer race against said drum.

2. In a recording-reproducing device comprising a record drum and a lead screw actuated by a common means, sensing means for moving said lead screw laterally with respect to said drum to compensate for variations in the position of said drum, said means including a bearing follower comprising inner and outer races and rotatable members therebetween, said outer race comprising a ring member having an arcuate portion extending beyond a lateral face of said bearing, said inner race being concentric with and affixed to said lead screw, said arcuate portion of said ring member being disposed in tangential contact with a lateral face of said drum, and spring means disposed in such manner as to exert pressure against said inner race and thereby force said ring member against said drum.

3. In a recording-reproducing device comprising a record drum and a lead screw actuated thereby, a bearing support for said lead screw, means for moving said lead screw laterally with respect to said drum to compensate for variations in the position of said drum, said means including a bearing follower comprising inner and outer races and rotatable members therebetween, said inner race being concentric with and affixed to said lead screw, said outer race comprising a lateral face disposed in contact with a lateral face of said drum, and spring means disposed under compression between said bearing support and said inner race to force said outer race against said drum.

4. In a recording-reproducing device comprising a record drum and a lead screw actuated thereby, a bearing support for said lead screw, means for moving said lead screw laterally with respect to said drum to compensate for variations in the position of said drum, said means including a bearing follower comprising inner and outer races and rotatable members therebetween, said outer race comprising a ring member having an arcuate portion extending beyond a lateral face of said bearing, said inner race being concentric with and attached to said lead screw, said arcuate portion of said ring member being disposed in tangential contact with a lateral face of said drum, and spring means disposed under compression between said bearing support and said inner race to force said ring member against said drum.

5. A recording-reproducing device in accordance with claim 4 wherein said spring means comprises a helical spring concentric with said lead screw.

No references cited.